H. J. FOSTER.
DEMOUNTABLE RIM.
APPLICATION FILED JUNE 12, 1918.
1,299,450.
Patented Apr. 8, 1919.
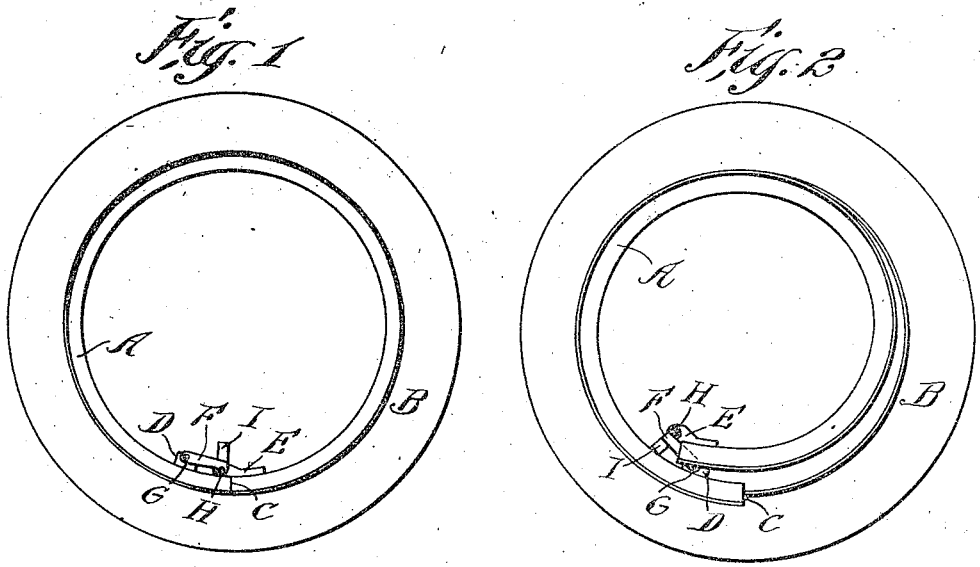
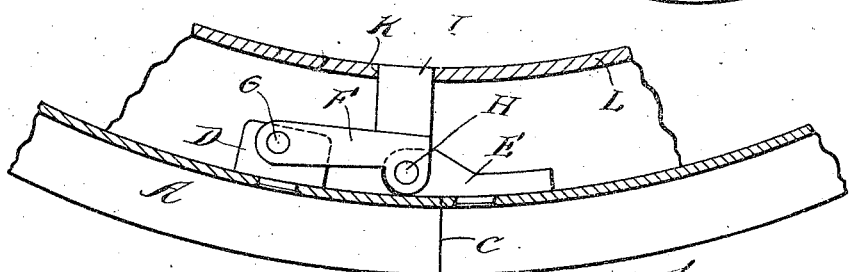
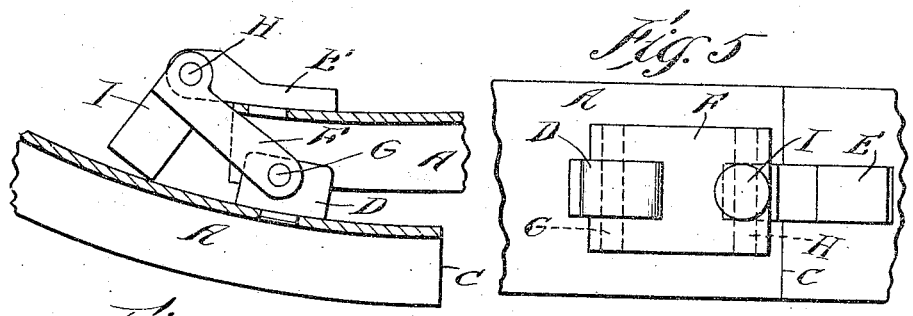

UNITED STATES PATENT OFFICE.

HENRY J. FOSTER, OF CLEVELAND, OHIO, ASSIGNOR TO HYDRAULIC PRESSED STEEL COMPANY, OF CLEVELAND, OHIO, A CORPORATION OF OHIO.

DEMOUNTABLE RIM.

1,299,450.

Specification of Letters Patent.  Patented Apr. 8, 1919.

Application filed June 12, 1918. Serial No. 239,623.

*To all whom it may concern:*

Be it known that I, HENRY J. FOSTER, a citizen of the United States, residing at Cleveland, in the county of Cuyahoga and State of Ohio, have invented a certain new and useful Improvement in Demountable Rims, of which the following is a full, clear, and exact description, reference being had to the accompanying drawings.

This invention relates to a one piece tran-split demountable tire-carrying rim and has for its object to provide a simple means for contracting and expanding the rim as desired, said operating means serving also as a connection between the ends of the rim, holding them against circumferential and lateral movement.

Another object of the invention is to utilize a part of the rim contracting and expanding means as a driving lug, and while this invention is particularly adapted for use in connection with demountable tire-carrying rims mounted upon channeled sheet metal fixed rims, it can also be used upon wheel bodies having the usual wooden felly and metal fixed rim.

Heretofore it has been extremely difficult to contract or collapse a one piece tran-split rim in which the cut has been made axially or in a radial plane, and it is therefore the object of the present invention to provide a very simple and highly efficient device which not only quickly and easily opens and closes the rim but also holds the same locked in either an opened or closed position.

With these various objects in view, and certain others which will become apparent as the description proceeds, the invention consists in the novel construction of the various parts and in the manner of arranging or combining them, all of which will be fully described hereinafter and set forth in the appended claims.

In the drawings forming a part of this specification Figure 1 is a side elevation of a tire-carrying rim arranged within a tire and provided with one embodiment of my invention as a means for opening and closing the said transplit rim. Fig. 2 is a similar view showing the position of the parts assumed when the rim is contracted. Fig. 3 is an enlarged view of the rim operating means, and showing the driving lug in connection with the base of a metal fixed rim.

Fig. 4 is a view, upon an enlarged scale, showing the position the rim ends and connecting means assume when the rim is contracted; and Fig. 5 is a detail plan view of the rim ends and the connecting and operating means connected thereto.

In the practical embodiment of my invention I employ a one piece rim A adapted to receive a tire B, and this rim can be either of the straight side or clencher type. This rim is divded or cut transversely at one point as shown at C, this cut being straight in an axial direction or in a radial plane, the cut being straight through both the sides and the base of the rim.

A lug or block D is rigidly connected to one rim end adjacent the division C but not at the end thereof.

A block or lug E is connected to the other end of the rim and preferably projects beyond the division C toward the first mentioned lug or block D, and pivotally connecting these lugs or blocks D and E is a link F; pivotally connected to the block D by means of a pivot pin G, and to the block or lug E by the pivot pin G, and it will be noted that the pivots G and H are both upon the same side of the division C, and it will also be noted that the center of the pivot G is nearer to the center of the rim than the center of the pivot H.

The block or lug E projecting beyond the division or split of the rim contacts with the inner face of the opposite end of the rim and positions the meeting ends of the rim. The link F is bifurcated at its opposite ends and the lugs or blocks D and E fit within the bifurcation and consequently the rim ends are held against both circumferential and lateral movement at all times.

The resiliency of the rim tends to hold the parts in their normal positions such as shown in Figs. 1 and 3, and the pivot H being lower than the pivot G, the link F acts as a toggle, and consequently, when the parts are in the position shown in Figs. 1 and 3 this toggle, coupled with the resiliency of the rim will always maintain the parts locked.

When however, it is desired to break the lock and contract the rim, the link F is swung back upon the pivot G, and in order to render this operation easy I provide the link F with a lug or stud I, which is adapted to be engaged by the bifurcated or apertured end of a suitable lever or tool (not shown) and by means of which the link can be thrown over through a considerable arc carrying the pivot H beyond the pivot G, and the moment the pivot H passes beyond the pivot G, the resiliency of the rim which has heretofore been acting in opposition to the force of the lever, now acts in conjunction therewith and carries the parts to the position shown in Fig. 2 and therefore locks the rim and the connecting means in their opened or contracted positions. If desired the lever can be removed from the lug or pin I without releasing the parts.

After the rim has been contracted, and locked in such contracted position as shown in Figs. 2 and 4, it is obvious that the tire can be quickly and easily placed thereon or removed therefrom.

When it is desired to unlock the parts from their contracted position and return them to their normal or expanded positions it is only necessary to bring the lever into engagement with the stud or pin I and move the same back to the position shown in Figs. 1 and 3, and as soon as the pivot H passes beyond the pivot G in this return movement, the resiliency of the rim will act to assist in the final operation carrying the pivot H below the pivot G and locking the toggle.

This device is preferably arranged upon rims which are intended to be used upon channeled sheet metal fixed rims and ample space is therefore provided within the channeled fixed rim for the lugs and link, and the inwardly projecting lug or stud I is adapted to be projected into a suitable opening K produced in the base of the fixed rim and therefore serves as a driving lug and also prevents any circumferential movement of the rim upon the fixed rim.

Any type of rim fastening devices can be employed for connecting the rim to the wheel body.

It will be thus seen that I provide a very simple means for connecting the ends of a straight cut one-piece rim said means being usable for contracting and expanding the rim as desired, and also usable as a driving lug in connection with the wheel body. It will also be noted that in addition to the ease and rapidity with which the device can be operated, that, in connection with the resilient rim, it provides a perfectly safe lock for holding the parts in either an open or closed position.

Having thus described my invention, what I claim is:—

1. A one piece tire carrying rim, divided transversely at one point, lugs connected to said rim ends, one of said lugs projecting beyond the dividing line, and a link pivotally connected to said members, the piot points of said link being at different distances from the center of the rim, said link being shaped for engagement with means for turning it upon its inner pivot.

2. A one piece transplit rim, members rigidly connected to said rim upon opposite sides of said split, one of said members projecting beyond said split, and a movable member pivotally connected to said rigid member and having means for engagement with a turning tool, said movable member being turnable upon its pivot remote from the split, said pivot being nearer the center of the rim than the other pivot.

3. A one piece tire carrying rim transplit at one point, lugs connected to the ends of said rim, a link pivotally connected to said lugs, both of the pivotal connections being upon the same side of the split, the pivot remote from the split being nearer the center of the rim than the other pivot.

4. A one piece tire carrying rim, divided transversely at one point, lugs rigidly connected to the ends of the rim, a link pivotally connected to said lugs and having an inwardly projecting stud, one of said lugs extending beyond the dividing line and adapted to serve as a stop against the opposite end of the rim.

5. A one piece tire carrying rim, divided transversely at one point, lugs connected to the rim, one at the end thereof and the other adjacent the other end, and a link pivotally connected to said lugs, the pivot in the remote lug being nearer the center than the other pivot, said link having an inwardly projecting stud adjacent the dividing line.

6. A one piece tire carrying rim, divided transversely at one point, lugs connected to said rim ends, one of said lugs projecting beyond the dividing line, a link pivotally connecting said lugs, the pivot remote from the dividing line being closer to the center of the rim than the other pivot, the body of said link being spaced from the base of the tire carrying rim.

7. A one piece tire carrying rim, divided transversely at one point, lugs connected to the ends of said rim, a link pivotally connected to said lugs, said link being entirely upon one side of the dividing line and a radial projection carried by said link, adjacent one pivot, the other pivot being nearer to the center of the rim and serving as a fulcrum.

8. A one piece tire-carrying rim divided transversely at one point, lugs rigidly connected to the rim ends, a link pivotally connected to said lugs, said link having a radial projection.

9. A transplit demountable tire carrying rim provided at the ends thereof with radially inwardly projecting lugs, a rigid bar pivotally connected to said lugs in such manner that the initial movement of the bar from operative position around either pivot as a center tends to separate the rim ends circumferentially.

10. A demountable tire carrying rim transversely split on a radial plane and provided at the ends thereof with radially inwardly projecting lugs, a rigid bar pivotally connected to said lugs in such manner that the initial movement of the bar from operative position around either pivot as a center tends to separate the rim ends circumferentially.

In testimony whereof, I hereunto affix my signature.

HENRY J. FOSTER.